United States Patent
Rao

(10) Patent No.: US 8,144,609 B2
(45) Date of Patent: Mar. 27, 2012

(54) NETWORK MONITORING SYSTEM AND METHOD THEREOF

(75) Inventor: Umesh Ramachandra Rao, Bangalore (IN)

(73) Assignees: Nippon Office Automation Co., Ltd., Tokyo (JP); Tazaki Toshimitsu, Tokyo (JP)

( * ) Notice: Subject to any disclaimer, the term of this patent is extended or adjusted under 35 U.S.C. 154(b) by 405 days.

(21) Appl. No.: 11/821,534

(22) Filed: Jun. 20, 2007

(65) Prior Publication Data

US 2008/0002595 A1    Jan. 3, 2008

(30) Foreign Application Priority Data

Jun. 23, 2006 (EP) .................................... 06253291

(51) Int. Cl.
*H04L 12/26* (2006.01)
(52) U.S. Cl. ................. 370/252; 714/100; 714/1; 714/2
(58) Field of Classification Search .......... 370/216–253; 714/100–57
See application file for complete search history.

(56) References Cited

U.S. PATENT DOCUMENTS

| | | | |
|---|---|---|---|
| 5,101,402 A * | 3/1992 | Chiu et al. ............... | 709/224 |
| 6,263,444 B1 * | 7/2001 | Fujita ....................... | 726/25 |
| 7,263,558 B1 * | 8/2007 | Khirman et al. .......... | 709/229 |
| 7,660,248 B1 * | 2/2010 | Duffield et al. ........... | 370/230.1 |
| 2003/0016627 A1 * | 1/2003 | MeLampy et al. ........ | 370/235 |
| 2003/0196081 A1 * | 10/2003 | Savarda et al. ............ | 713/153 |
| 2004/0030927 A1 * | 2/2004 | Zuk .......................... | 713/201 |
| 2004/0054813 A1 | 3/2004 | Boucher et al. | |
| 2004/0240387 A1 * | 12/2004 | Nuzman et al. ........... | 370/252 |
| 2004/0264405 A1 * | 12/2004 | MacGregor Scobbie .. | 370/328 |
| 2005/0018618 A1 * | 1/2005 | Mualem et al. ........... | 370/252 |
| 2005/0047339 A1 * | 3/2005 | Dube et al. ............... | 370/230 |
| 2005/0141430 A1 * | 6/2005 | Borkowski ................ | 370/241 |
| 2005/0157662 A1 * | 7/2005 | Bingham et al. .......... | 370/254 |
| 2005/0198268 A1 * | 9/2005 | Chandra ................... | 709/224 |
| 2005/0210031 A1 * | 9/2005 | Kasatani .................. | 707/10 |

FOREIGN PATENT DOCUMENTS

| | | |
|---|---|---|
| WO | 01/88731 A1 | 11/2001 |
| WO | 2005/071890 A1 | 8/2005 |

OTHER PUBLICATIONS

Newton's Telecomm Dictionay, 22nd Edition, Received May 24, 2006.*
"Cisco IOS Netflow Overview," Cisco Systems Feb. 5, 2006 (retrieved from the internet from www.cisco.com Aug. 28, 2006).
Bhat, S., "The Network Advisor Analysis and Real-Time Environment," vol. 43, No. 5, pp. 29-33 (Oct. 1, 1992).
Hoare, R., et al., "ePAPP: A Gigabit embedded protocol analyzer pre-processor," 2005 48th IEEE International Midwest Symposium on Circuits and Systems vol. 1, pp. 59-62 Aug. 7, 2005 (IEEE Catalog No. 05CH37691).

* cited by examiner

*Primary Examiner* — Hassan Kizou
*Assistant Examiner* — Charles C Jiang
(74) *Attorney, Agent, or Firm* — Ladas & Parry, LLP

(57) ABSTRACT

A packet processing engine is disclosed which comprises (a) packet processor for sniffing the packets and for analyzing traffic, and (b) core engine for packet processing. The core engine comprises means for extraction of protocols to build protocol analysis data and means for protocol-based analysis of the packets.

1 Claim, 13 Drawing Sheets

NETWORK MONITORING SYSTEM AND METHOD THEREOF

FIELD OF THE INVENTION

Figure 1:
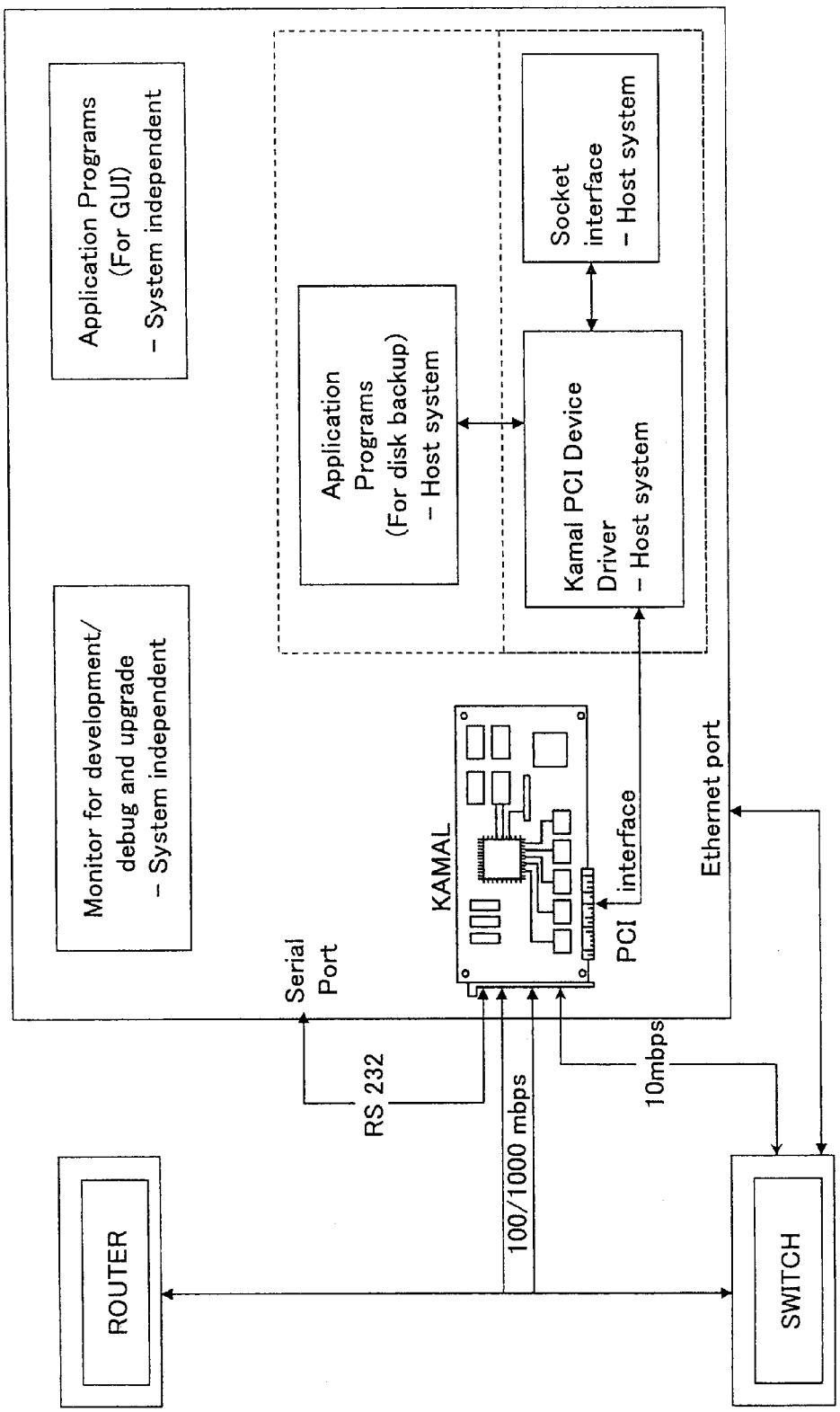

A network monitoring system for analyzing network data traffic and session level analysis of packets and method thereof.

RELATED ART

Traditionally we can develop software for collecting one packet from sof (start of file) to eof (end of file), and then return to calling routine, so that the calling routine can in turn call a routine to analyze the protocol. Software is useful only to an extent of ease of programming. Here we are making an attempt to provide hardware solution for packet analyzing. As a hardware solution, we need to examine every incoming quad-octet and take decision, before next quad-octet arrives. Our instant technology development is more like a hardware solution, since a lot of processes have to run in true parallel architecture and share common resources.

SUMMARY OF THE INVENTION

An object of the present-invention is to address the above limitations through a novel solution based on the idea of hardware solution, exploiting parallelism and other special feature of network processor chip, for example.

Another object of the invention is process to run in true parallel architecture and share common resources.

Yet another object of the invention is to provide monitoring system for real time network traffic in full duplex.

Still another object of the invention is to provide real time ability which provides the real-time IP data analysis information in the core network.

Still another object of the invention is to provide high-performance and scalability through innovative architecture of microengine code and data flow in between each microengine and to and from each of these microengines and the arm core.

Still another object of the invention is to provide system which performs reassembling of packets at microengine level.

Still another object of the present invention is to develop a network monitoring system to achieve the aforementioned requirements.

Still another object of the invention is to develop a packet processing engine and application layer processor to achieve the aforementioned requirements.

Still another object of the present invention is to develop a method for monitoring and analyzing using said monitoring system.

Still another object of the present invention is to develop software for monitoring and analyzing.

To achieve at least one of the above objects, a network monitoring system for monitoring network data traffic, according to an aspect of the invention, is provided. Said monitoring system comprises,
(i) packet processing engine consisting of,
 (a) packet processor for sniffing the packets and for analyzing traffic,
 (b) core engine for packet processing consisting of,
  means for extraction of protocols to build protocol analysis data,
  means for protocol-based analysis of the packets, and (ii) application layer Processor for Session level Analysis consisting of,
 (a) means for extraction of every session and to build session data,
 (b) means for session-based analysis of the packets.

According to another aspect of the invention, a method for monitoring network data traffic, said method comprises steps of;
 a. sniffing packets,
 b. checking the sniffed packets for fragmentation and reassembling,
 c. analyzing the checked packets for protocols,
 d. saving the analyzed packets onto host memory,
 e. creating sessions from the saved packets,
 f. analyzing and thereby segregating the sessions, and
 g. uploading the segregated sessions onto the host memory.

According to yet another aspect of the invention, an architecture of microengine code and data flow in between each microengine and to and from each of these microengines and the arm core for analyzing packets is provided, wherein said architecture of microengine code and data flow in between each microengine and to and from each of these microengines and the arm core is developed by pipelining and parallelizing of the process and thereby integrating the same into architecture of the microengine.

BRIEF DESCRIPTION OF THE ACCOMPANYING DRAWINGS

Figure 2:
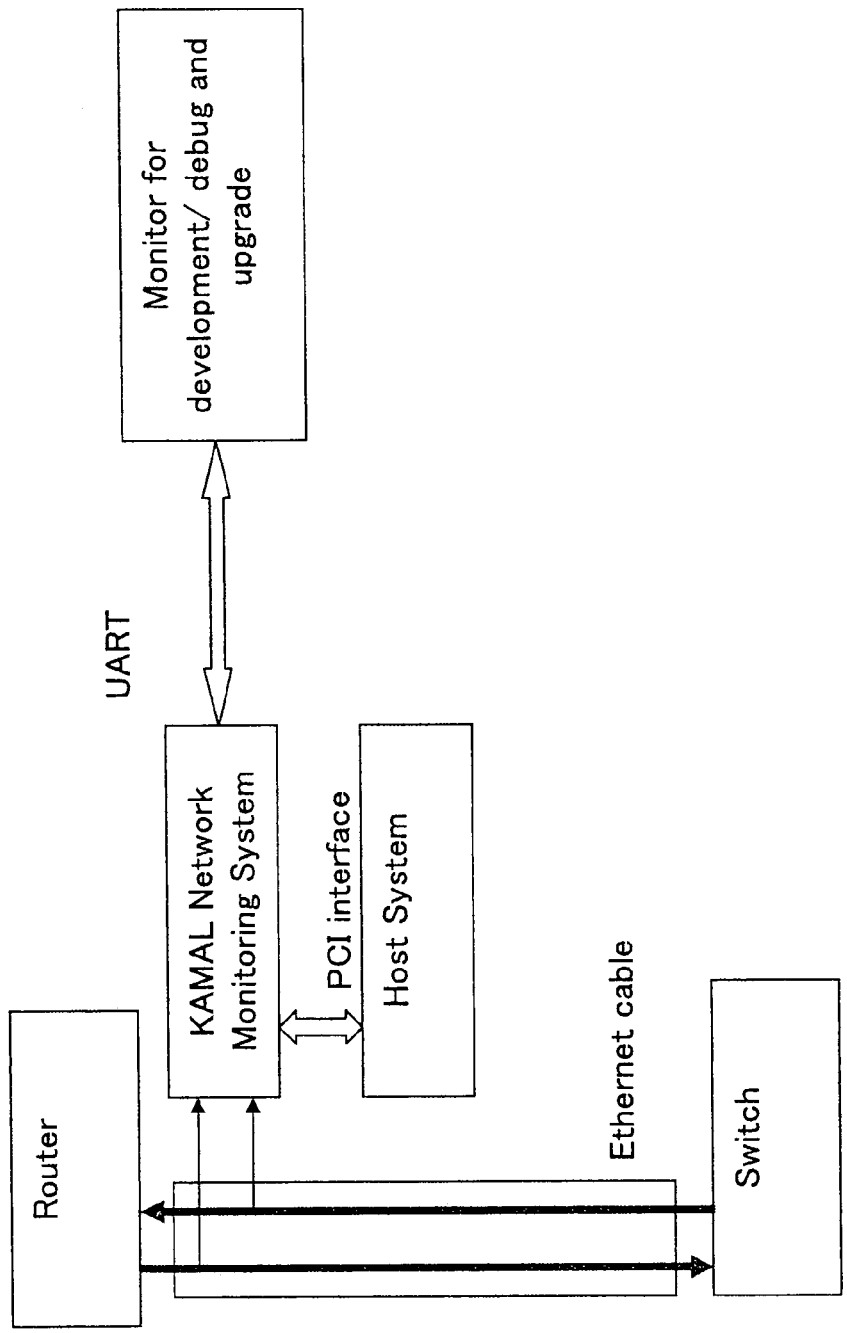
Figure 3:
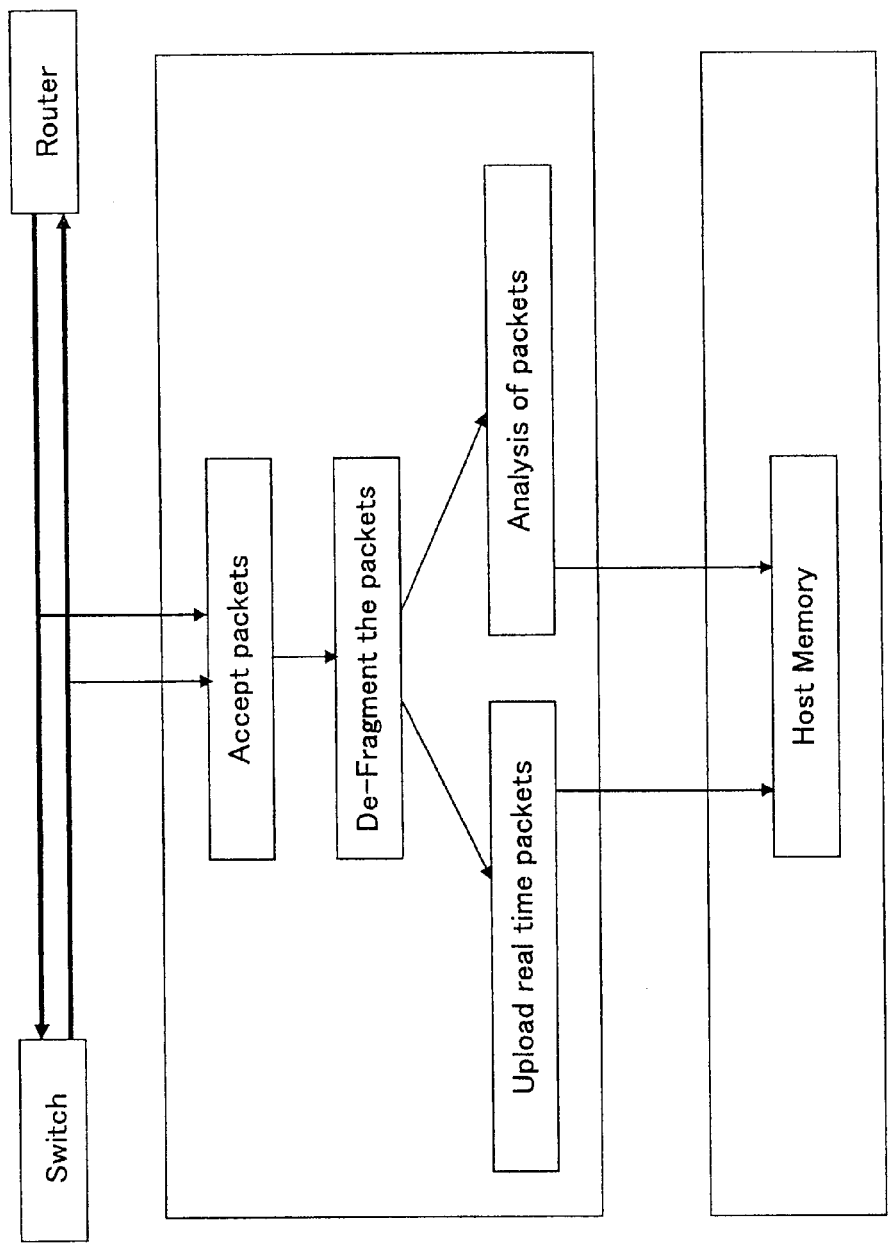
Figure 4:
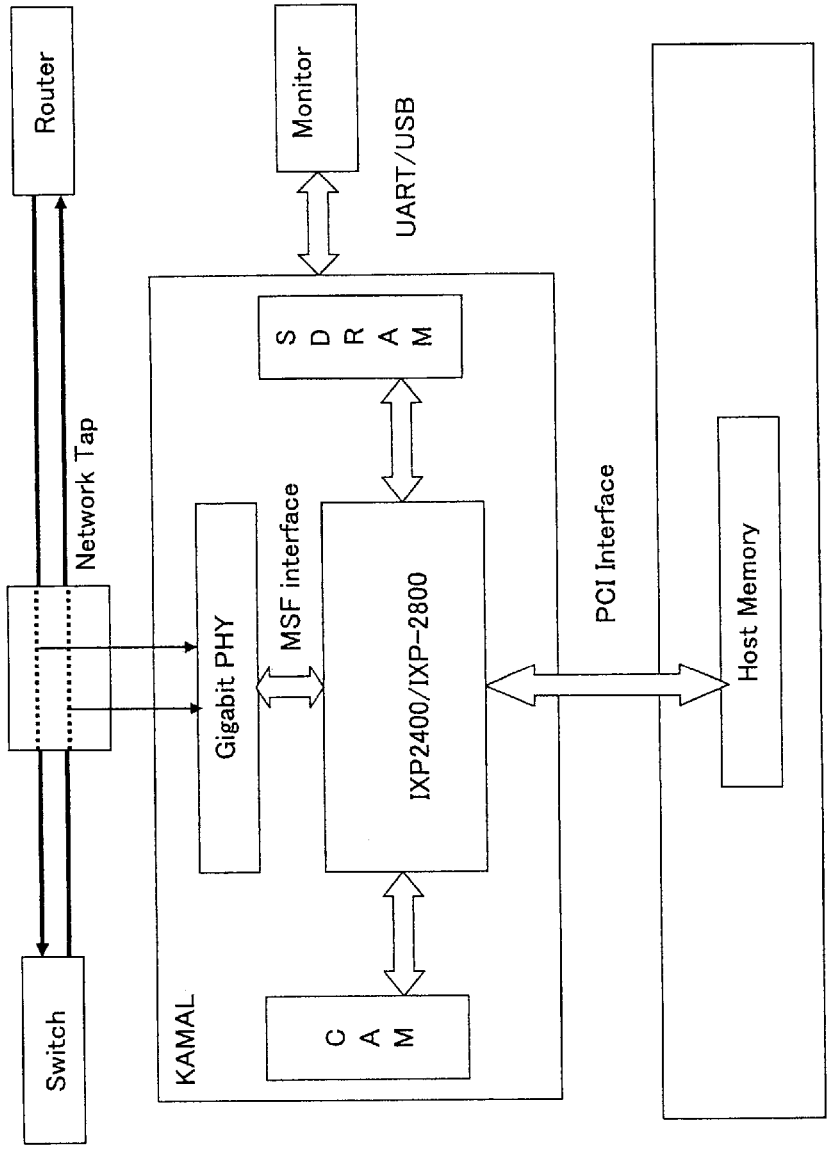
Figure 5:
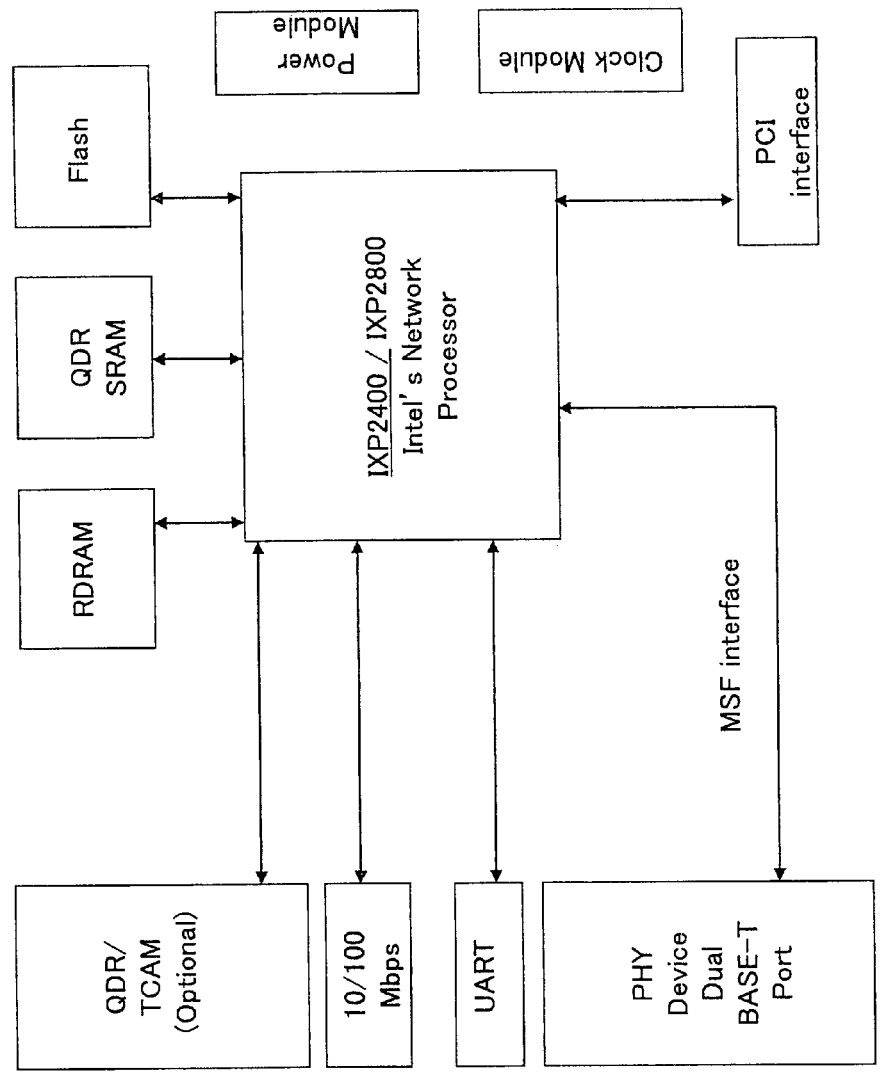
Figure 6:
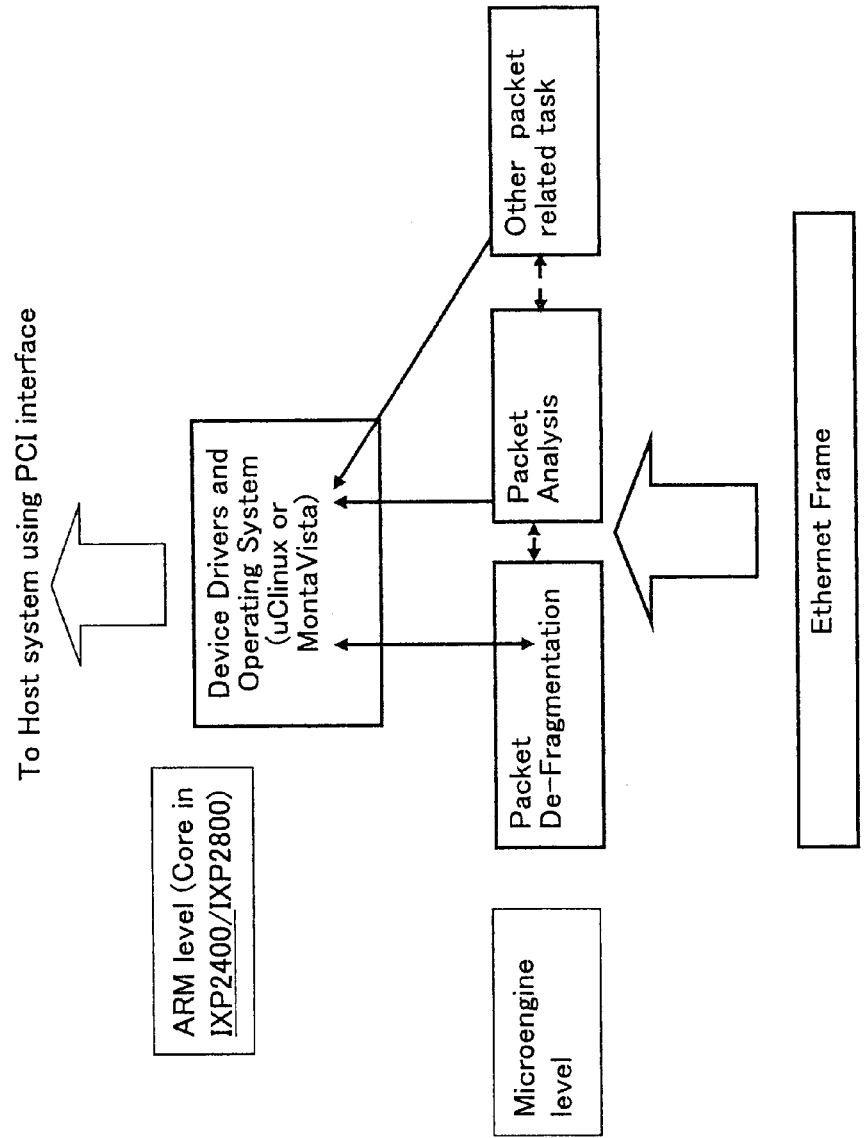
Figure 7:
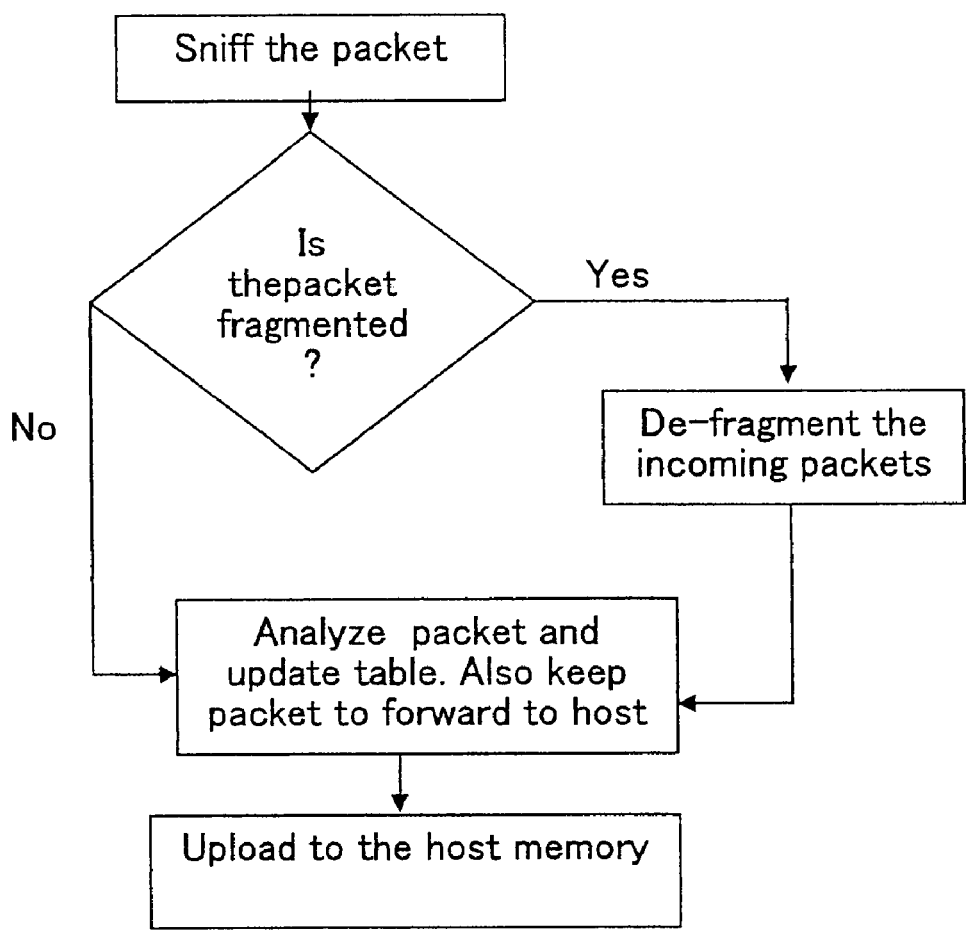
Figure 8:
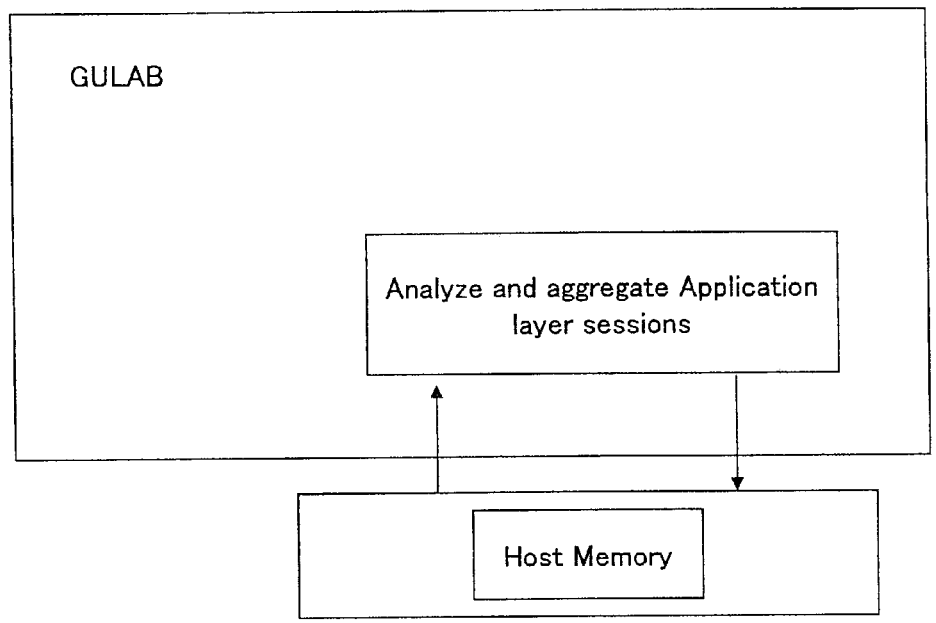
Figure 9:
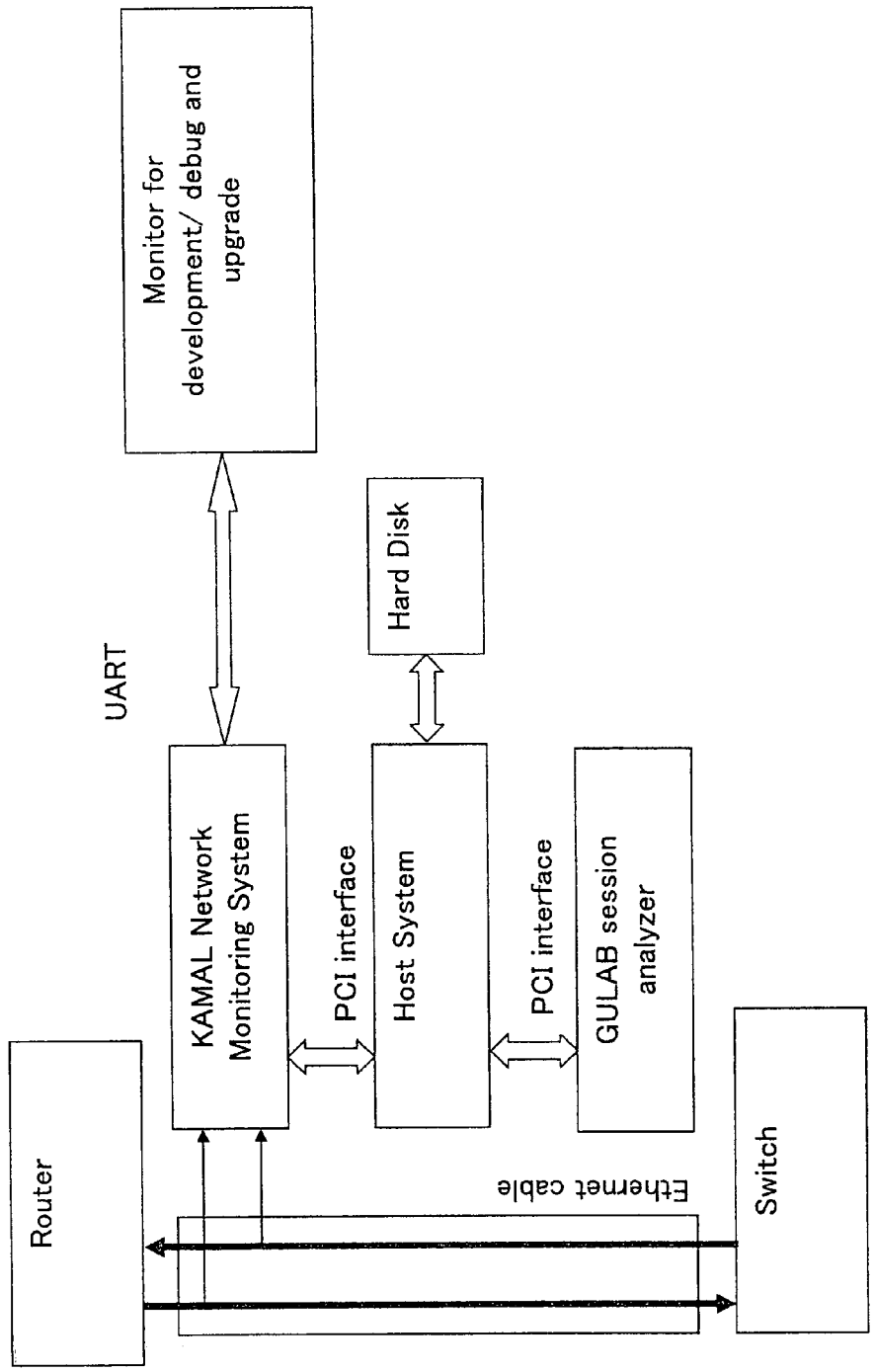
Figure 10:
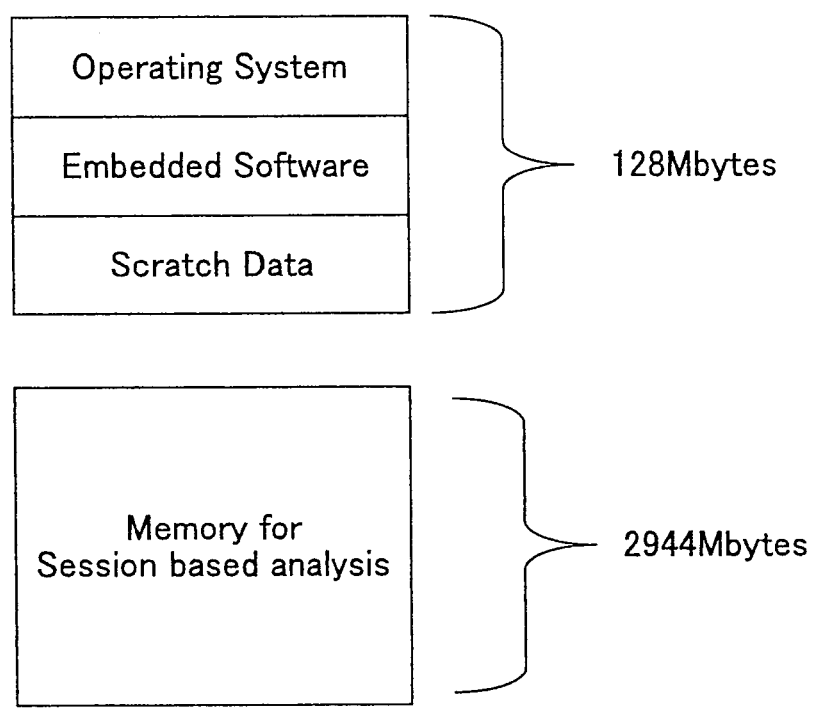
Figure 11:
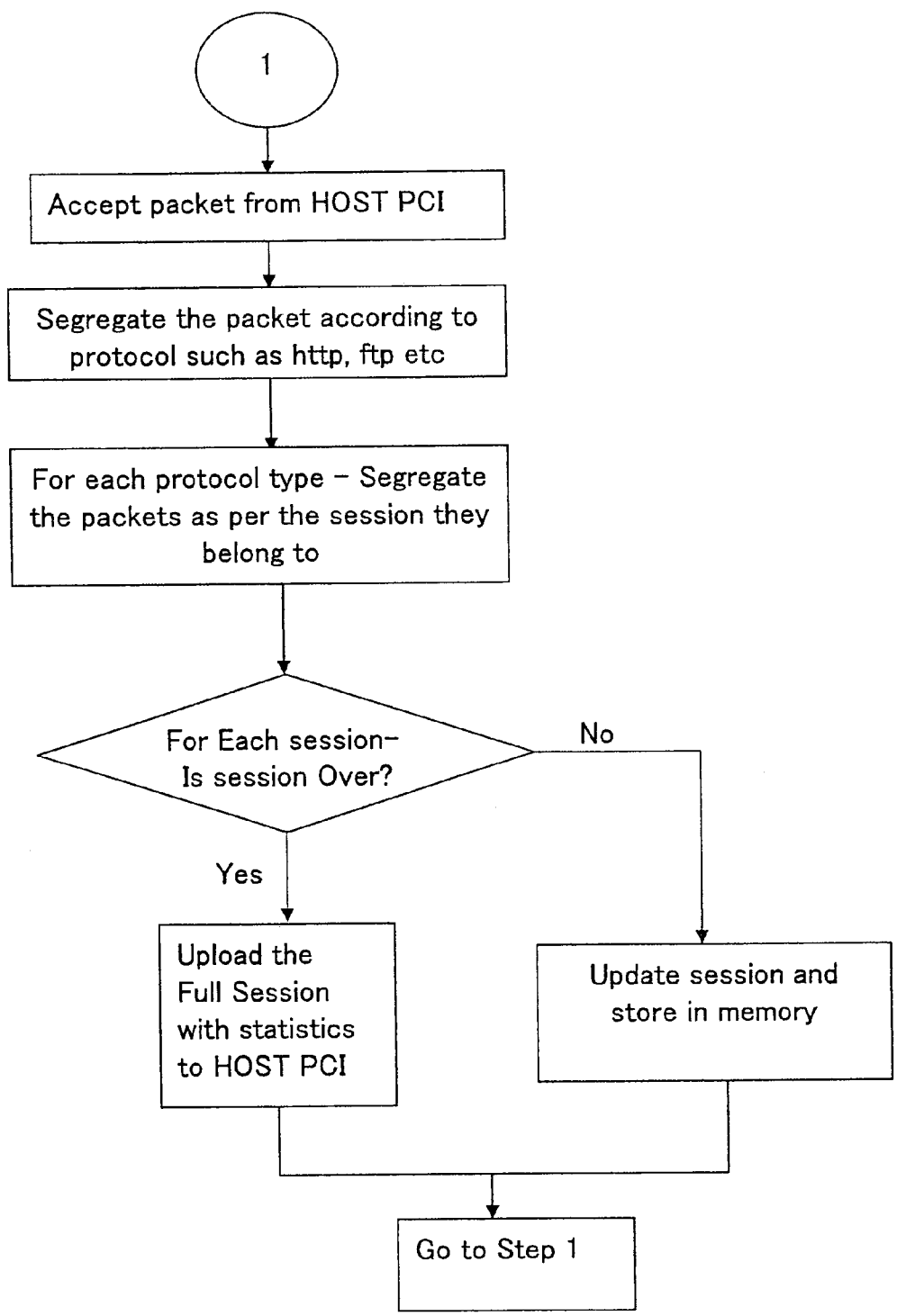
Figure 12:
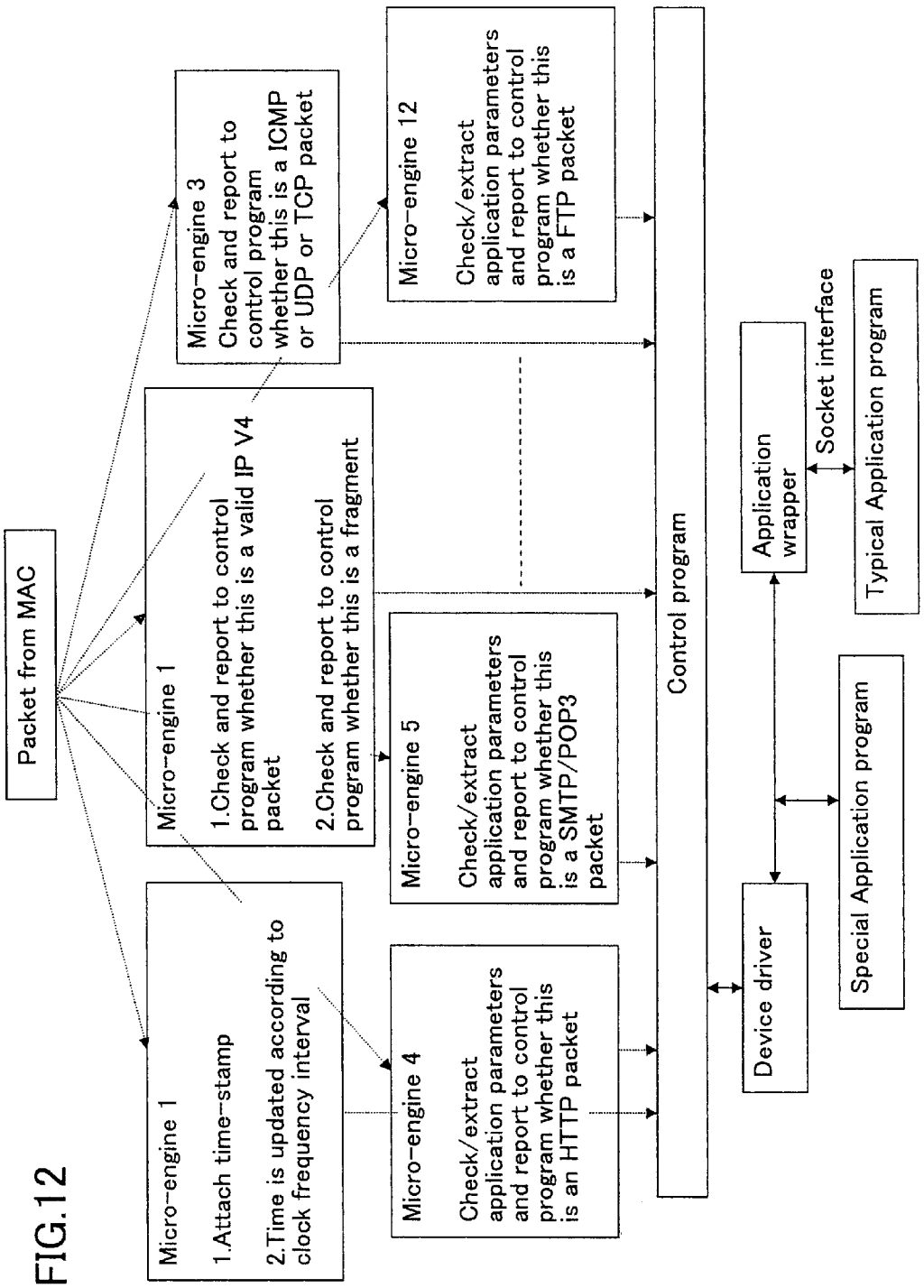
Figure 13:
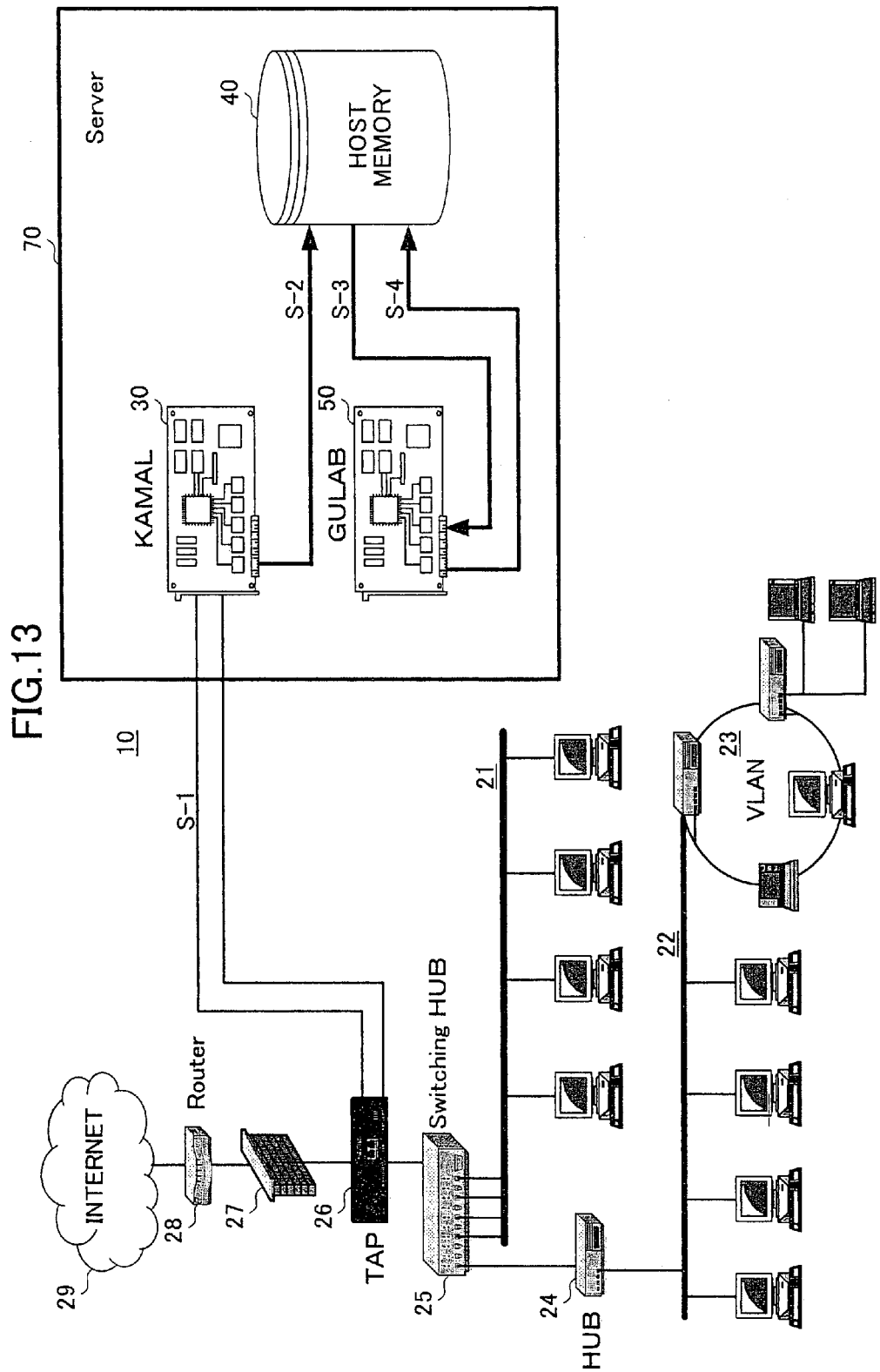

FIG. 1 shows a typical deployment scenario of packet processing engine;
FIG. 2 shows system in the field-packet processing engine;
FIG. 3 is functional block diagram of packet processing engine;
FIG. 4 is high level hardware block diagram of packet processing engine;
FIG. 5 is hardware block diagram using network processor;
FIG. 6 is packet processing engine software stack diagram;
FIG. 7 shows basic software flowchart for packet processing engine;
FIG. 8 shows session analyzer;
FIG. 9 shows system in the field-session analyzer;
FIG. 10 shows RDRAM memory map;
FIG. 11 shows operation of session analyzer;
FIG. 12 shows Microengine Architecture; and
FIG. 13 shows a network in which the packet processing engine and the session analyzer according to the present invention may be implemented.

DETAILED DESCRIPTION OF THE INVENTION

A network monitoring system for monitoring network data traffic, said monitoring system comprises,
(i) packet processing engine consisting of,
 (a) packet processor for sniffing the packets and for analyzing traffic,
 (b) core engine for packet processing consisting of,
  means for extraction of protocols to build protocol analysis data,
  means for protocol-based analysis of the packets, and
(ii) application layer Processor for Session level Analysis consisting of,
 (a) means for extraction of every session and to build session data,
 (b) means for session-based analysis of the packets, also a method for monitoring Network data traffic, said method comprising steps of;
  h. sniffing packets,
  i. checking the sniffed packets for fragmentation and reassembling,
  j. analyzing the checked packets for protocols,
  k. saving the analyzed packets onto host memory,
  l. creating sessions from the saved packets,
  m. analyzing and thereby segregating the sessions, and
  n. uploading the segregated sessions onto the host memory, and also an architecture of microengine code and data flow in between each microengine and to and from each of these microengines and the arm core for analyzing packets, wherein said architecture of microengine code and data flow in between each microengine and to and from each of these microengines and the arm core is developed by pipelining and parallelizing of the process and thereby integrating the same into architecture of the microengine.

A packet processing engine comprising,
  (a) packet processor for sniffing the packets and for analyzing traffic, and
  (b) core engine for packet processing consisting of,
    means for extraction of protocols to build protocol analysis data,
    means for protocol-based analysis of the packets.

A method for packet processing, said method comprising steps of,
  (i) sniffing packets,
  (ii) checking the sniffed packets for fragmentation and reassembling,
  (iii) analyzing the checked packets for protocols, and
  (iv) saving the analyzed packets onto host memory.

An application layer Processor for session level analysis comprises,
  (a) means for extraction of every session and to build session data, and
  (b) means for session-based analysis of the packets.

A method for Session level Analysis, said method comprising steps of,
  (i) accepting packets from host memory,
  (ii) creating sessions from the accepted packets,
  (iii) analyzing and thereby segregating the sessions, and
  (iv) uploading the segregated sessions onto the host memory.

Packet processing engine (hereafter also termed as KAMAL) is a powerful full duplex packet-processing engine, built around Intel's IXP series network processor, that can be configured for analyzing network protocols, aggregation of packets based on user defined filter criteria and application layer analysis in either 100 mbps or 1 Gbps modes in real-time.

Since the processing takes place in real-time at protocol level and application level, the system can be deployed in various fields, especially for sensitive applications for network security and net monitoring that requires sniffing across broad LAN/WAN environments, of each and every packet as well as each and every application.

The system has two Gigabit PHY ports that will be connected to the network. All packets of the traffic on this network are delivered to the core engine. This engine is implemented using IXP2400/IXP2800, an advanced network processor from Intel. The core engine performs de-fragmentation of fragmented packets and analysis of the packets. The analyzed data is then saved on to the host memory, along with the packets, using a PCI interface.

Next version of Kamal has features for aggregating and assembling of packets as per user defined filter criteria.

Packet Processing Engine-Features
  1. Real time Gigabit Network Traffic support up to 1 Gbps. For efficient resource utilization, the maximum speed supported can be configured for 100 Mbps/1 Gbps operation.
  2. Complete re-assembly of the packet.
  3. Aggregation with user defined filter capability. The filter criteria can be based on matching of certain parameters in the packet e.g. IP address, Port no. etc.
  4. Content Analysis with PAYLOAD TYPE for Voice, Video and Audio Data.
  5. IP ranges: Possibility to set IP ranges using bit masking. e.g. 192.168.1.64 to 192.168.1.127 as filter criteria.
  6. Time stamp: Time stamp for each IP packet with Hour-Minute-Seconds—Milliseconds-micro seconds.
  7. Protocols—KAMAL enables analysis of following protocols:—
    TCP, UDP, http, SMTP/POP3, RTP, SIP, H.323, VoIP, ICMP, Telnet, FTP & DNS.
  8. PCI complaint board.
  9. C callable functions for development of GUI interface for defining Filters and Configuration parameters dynamically on any platform (Windows or Linux).

Packet processing engine is a powerful full duplex Application level network processing engine, built around Intel's IXP series network processor, that can be application layer analysis in either 100 mbps or 1 Gbps modes in real-time.

Since the processing takes place in real-time at protocol level and application level, the system can be deployed in various fields, especially for sensitive applications for network security and net monitoring that requires sniffing across broad LAN/WAN environments, of each and every packet as well as each and every application.

The protocol-analyzed packets uploaded to host by KAMAL are stored in a hard disk in the host. These packets are then uploaded to the Application layer processor (hereafter also termed as GULAB) card via PCI interface by the host from hard disk. GULAB will then segregate these packets as per the session they belong to. Once a session is complete, then all these packets that have been re-assembled at session level are uploaded back to host, along with session information such as time stamp, originator and packet count etc. FIG. 13 shows an exemplary network in which the network monitoring system according to the present invention is implemented. As shown in FIG. 13, the network 10 includes local area networks (LAN) 21 and 22 to which multiple personal computers, workstations, and/or servers are connected to each other, for example. The LAN 22 may include a virtual LAN 23. Those LAN 21 and 22 are connected to a switching HUB 25 directly (in the case of LAN 21) and indirectly via a local HUB 24 (in the case of LAN 22). It would be appreciated that the LAN 21 and 22, the connection between the LAN 21, 22 and the switching HUB 25 may be wired or wireless. The switching HUB 25 is connected to a router 28 through a firewall 27, which prevents any unauthorized party from accessing the internal resource of the LAN. The users of the personal computers and/or workstations provided in the LAN 21 and 22 are capable of accessing the Internet 29 through the router 28.

As shown in FIG. 13, a TAP 26 is also provided in the network 10 between the switching HUB 25 and the firewall 27 to tap any data flowing through the network 10 between the switching HUB 25 and the router 28, for example. The data tapped by the TAP 26 is provided to a server 70 in which KAMAL 30 and GULAB 50 according to embodiments of the present invention are provided. KAMAL 30 sniffs and captures the data (packets) along with mac address from network layer protocol and application layer protocol (S-1). KAMAL 30 adds time stamp and identification information (for example, serial number) of itself (KAMAL 30). After content-matching and/or protocol analysis, an aggregation of packets corresponding to each protocol is uploaded to a host memory 40 such as a hard disk drive provided in the server 70 (S-2). The aggregation of packets is sequentially uploaded in a configurable manner. The aggregation of packets uploaded by KAMAL 30 is downloaded to GULAB 50 (S-3), which assembles session packets along with session information and then uploads the assembled session packets to the host memory 40 (S-4). According to an embodiment, the download and assembly by GULAB 50 may be performed after a predetermined amount of packets are uploaded to the host memory 40 by KAMAL 30. The above steps are further described in more detail below.

According to the above arrangements, KAMAL 30 and GULAB 50 can monitor the protocol packets in real-time both at protocol level and application level and reconstruct the monitored protocol packets by performing the session based analysis of the packets. The system will segregate the packets according to the session they belong to and upload to the host memory 40.

It is assumed that the packets captured by KAMAL 30 and the packets reconstructed by GULAB 50 are uploaded (stored) in the same host memory 40 as shown in FIG. 13, it will be appreciated that the packets captured by KAMAL 30 and the packets reconstructed by GULAB 50 may be uploaded (stored) in different host memories provided in and/or out of the server 70.

Session Analyzer Features
1. The extraction of every session and build session data
2. Incomplete sessions are also compiled to the extent available, ensuring each and every packet is accounted for.
3. HTTP sessions are built with information such as Request method, web-site name, url, Content Type apart from start and end time stamp of the session.
4. For POP3/SMTP, it will build information such as "user name", "password", "from", "to", "subject", "attached file name/s" etc.
5. Similar database built for other application protocols.
6. Keep alive and multiple sessions are handled appropriately.
7. All parameters extracted from Kamal also available, such as source IP, destination IP, MAC addresses, source port, destination port etc
8. Indexing of files for assisting in searching, sorting, aggregating, displaying of graphs & charts and for supporting queries/query scripts/languages.

Introduction

The document gives a brief idea about the hardware design of KAMAL. It includes systems overview with brief description about the KAMAL functions and specifications with hardware block diagrams and software flowchart.

System Overview

The entire system along with KAMAL in the field is illustrated in FIG. 2. KAMAL is connected to the network by two independent 10/100/1000-BASE-T taps, which are in turn connected to the network subsystem, whose traffic needs to be analyzed. KAMAL collects Ethernet packets and analyzes it according to the algorithm given and saves the result in a table which will get uploaded onto the host memory via PCI interface. KAMAL can be controlled using GUI which is running on a Windows/Linux based host in which KAMAL is installed. For development purpose, KAMAL may be controlled by a PC running Windows, connected to KAMAL.

KAMAL is a gigabit network monitoring device based on Intel's advanced IXP2400/IXP2800 network processor, which is attached to main system using PCI interface. It will sniff the packets in the network coming from router to the LAN and analyze the traffic as per requirements.

KAMAL can be configured using GUI. All the collected and analyzed data is uploaded to the host memory using the PCI interface in a certain file format for any further processing by the application.

System Architecture

The following block diagram gives a high level flow of the system to realize the specifications given. FIG. 3 shows KAMAL functional block diagram.

In FIG. 3, the ingress packets get fragmented and de-fragmented (as per RFC 791) and the de-fragmented packet is analyzed using the protocol field of the packet and the timestamp. The analyzed data is saved on the host memory.

It is also possible to analyze data in real time using the KAMAL hardware. This means that the KAMAL monitors the ingress packets on the fly by implementing appropriate hardware on the KAMAL board itself.

KAMAL has two memory channels to save the data on the host memory; one for analyzed packets and another for real time analyzed packets.

System Functional Block Diagram

A high level hardware realization of KAMAL is shown in FIG. 4.

The system has two Gigabit PHY ports that will be connected to the network and which deliver the packets to the core engine. This engine is implemented using IXP2400IXP2800, an advanced network processor from Intel. The core engine performs de-fragmentation of fragmented packets and analyses of the packets. The analyzed data is then saved on to the host memory, along with the packets, using a PCI interface, as shown in FIG. 4.

Functional Requirement Specification:
  KAMAL: Supported Features
  Real time Network Traffic support to up to 100 Mbps full duplex. Future versions shall support 1 Gbps full duplex.
  Complete Defragmentation of the duplex.
  Aggregation Module
  Content Analyses with PAYLOAD TYPE for voice, Video and Audio Data
  Real time ability: KAMAL provides the real-time IP data analyses information in the core network.
  Operating system: Redhat Linux supported initially. Other OS such as Suse Linux and Timesys supported in subsequent versions.
  Time stamp: Time stamp for each IP packet with Hour-Minute-Seconds-milliseconds-micro seconds.
  Prorcols—KAMAL enables analyses of following protocols:—
  TCP
  UDP
  http
  SMTP/POP3
  RTP
  SIP
  H.323
  VoIP
  ICMP
  Telnet
  FTP
  DNS
  KAMAL Card is PCI complaint.

C callable functions for development of GUI interface for defining Configuration parameters dynamically on any platform (Windows or Linux).

System Interfaces

Hardware Interface

A more detailed block diagram of KAMAL using Intel's IXP2800 is shown in FIG. 5. The board will have real estate like RAM, Flash memory, and other chips. The board also has a 10/100 Mbps Ethernet and a UART port to be used for development of the system and for loading the source code as well as OS onto the processor. The board has an optional CAM that can be used for lookup tables in the system.

Intel's IXP2400/IXP2800 has 8/12 micro engines and one ARM core. Packet processing is done using the micro engines (driven by 1 GHz to 2.4 GHz variable clock). The ARM core has LINUX OS for system control and can be used for slow path functionalities.

The Intel® IXP2400/IXP2800 Network Processor enable fast deployment of complete content processing by providing unlimited programming flexibility, code re-use, and high-performance processing. This network processor support a wide variety of WAN and LAN applications that require support for a broad range of speeds—currently ranging from OC-3 to OC-192. High-performance and scalability are achieved through an innovative Microengine architecture that includes a multi-threaded distribution cache architecture that enables pipeline features in software. In addition to the standard feature set available with the IXP2400/IXP2800 integrates functionality for secure network traffic at 2/10 Gbits/s. This enables the up-front design of secure network equipment and results in lower overall system cost for power consumption, board real estate, and silicon investment.

Twelve Integrated Microengines
  Operating frequency of up to 1.4 GHz
  Configurable to four or eight threads per Microengine
  640 Dwords of local memory per Microengine
  Sixteen-entry CAM per Microengine with single-cycle lookup
  Next Neighbor bus accessing adjacent Microengines
  CRC unit per Microengine
  8K instructions control store per Microengine
  Support for Generalized Thread Signaling
Integrated Intel XScale® Core
  Operating frequency of up to 700 MHz
  High Performance, low-power 32-bit embedded RISC processor
  32 Kbyte instruction cache
  32 Kbyte data cache
Three industry standard RDRAM Interfaces
  Peak bandwidth of 2.1 Gbytes/s
  800-MHz and 1066-MHz RDRAM
  Error Correction Code (ECC)
  Addressable from Intel XScale®core, Microengines, and PCI
Four industry standard 32-bit QDR SRAM Interfaces
  Peak bandwidth of 1.9 Gbytes/s per channel
  Up to 233-MHz SRAM
  Hardware support for Linked List and Ring operations
  Atomic bit operations
  Atomic arithmetic support
  Addressable from Intel XScale® core, Microengines, and PCI
Integrated Media Switch Fabric Interface
  Two unidirectional 16-bit Low-Voltage Differential Signaling (LVDS) data interfaces
  Up to 500 MHz per channel
  Separately configurable for either SPI-4 or CSIX protocols
Industry standard PCI Bus
  PCI Local Bus Specification, Version 2.2 interface for 64-bit 66-MHz I/O
Additional integrated features
  Hardware Hash Unit (48, 64, and 128 bit)
  16 KByte Scratchpad Memory
  Serial UART port for debugging
  Eight general-purpose I/O pins
  Four 32-bit timers
1356 Ball FCBGA package
  Dimensions of 37.5 mm×37.5 mm
  1 mm solder ball pitch The operating frequency of the IXP2400/IXP2800 and the bus widths of the interfaces for KAMAL are still to be finalized.

RDRAM

The Intel® IXP2800 Network Processor has controllers for three Rambus DRAM (RDRAM) channels. Each of the controllers independently accesses its own RDRAMs, and can operate concurrently with the other controllers (i.e., they are not operating as a single, wider memory). DRAM provides high-density, high-bandwidth storage and is often used for data buffers.

RDRAM sizes of 64, 128, 256, and 512 MB, and 1 GB are supported. However, each of the channels must have the same number, size, and speed of RDRAMs populated. KAMAL may use RDRAM up to 256 MB per channel.

QDR SRAM and TCAM

IXP 2800 has four independent SRAM controllers for four channels. Each channel supports up to 64 Mbytes of SRAM. The fourth channel of the Ingress network processor also supports an optional Ternary Content Addressable Memory (TCAM) coprocessor that adheres to QDR signaling. Any or all controllers can be left unpopulated if the application does not need to use them. SRAM is accessible by the Microengines, the Intel® XScale core, and the PCI Unit (external bus masters and DMA).

Flash

The flash used in the system utilizes slow port of IXP2400/IXP2800. The Slow Port is nothing but an 8-bit asynchronous data bus. The flash memory will be of 16 MB size.

PCI Interface

The PCI Controller provides a 64-bit, 66-MHz-capable PCI Local Bus Specification, Version 2.2 interface to the Intel® IXP2400/IXP2800. It is also compatible to 32-bit and/or 33-MHz PCI devices. The PCI controller provides the following functions:
  Target Access (external Bus Master access to SRAM, DRAM, and CSRs)
  Master Access (Intel XScale® core or Microengine access to PCI target devices)
  Two DMA Channels
  PCI Arbiter The network processor can be configured to act as a PCI central function (for use in a stand-alone system), where it provides the PCI reset signal, or as an add-in device, where it uses the PCI reset signal as the chip reset input.

PHY Interface

The Media and Switch Fabric (MSF) Interface connects the Intel® IXP2400/IXP2800 Network Processor to a physical layer device (PHY) as shown in FIG. 5.

UART and 10/100 Mbps Ethernet

These interfaces can be use for development and debugging purpose of the KAMAL in development stage as well as on field operation. UART will be RS-232 standard.

Clock Module

The fast frequency on the IXP2400/IXP2800 Network Processor is generated by an on-chip PLL that multiplies a reference frequency provided by an on-board LVDS oscillator (frequency 100 MHz) by a selectable multiplier. The multiplier range is even multiples between 16 and 48, so the PLL can generate a 1.6 GHz to 4.8 GHz clock (with a 100-Mhz reference frequency).

Power Module

Power module will take reference power of 3.3 v from PCI bus from the host system and will use suitable power converters and regulators to get different set of voltages for different modules and chipsets in the system.

Software Interface

As shown in FIG. 6, the software stack handles the incoming Ethernet frame through the micro engines. All the packet processing and analysis is also done by the micro engines. The Xscale (an ARM processor) core in IXP2400/IXP2800 has an embedded Linux OS. This handle the entire interface and 10 related tasks and their device drivers. The OS also handles the host interface and GUI related tasks. Once packet comes into the processor it is fragmented or de-fragmented as required, analyzed at the micro engines and then forwarded to Xscale core. The Xscale forwards and stores all relevant data via the PCI interface onto the host memory.

Basic software flowchart for KAMAL is shown in FIG. 7.

Basic Algorithm:
1. Sniff the packets from the network interface
2. Check for the fragmentation bit. If it is set then collect all the fragmented packets and de-fragment it using identification field. Then go. for step 4
3. If fragmentation bit is not set, go for 4th step
4. Analyze the packet using Source IP, Destination IP, Protocol field and data load
5. Update the database and upload it to the host system memory with timestamp, also save the packets on the host memory.

The matrix of the file need to upload will be as shown,

| No. | Source IP | Destination IP | Protocol | Data Format (Audio/Video/ Data etc.) | Time- stamp | ..... |
|---|---|---|---|---|---|---|

The matrix can be increased with any inputs which belong to any field of the IP packet. Like
Source port, destination port
TTL
Data length etc.

GULAB

Introduction

GULAB is an add-on card which will utilize the PCI interface to communicate with the host system. GULAB will accept the packets saved onto the host system (for example in a Hard Disk Drive) after being processed by KAMAL, and will perform the session based analysis of the packets. It will segregate the packets according to the session they belong to and upload to the host, each of these sessions, after compiling all the packets that belong to a particular session. The system in the field is as shown in FIG. 8.

RDRAM Memory Management

GULAB shall have an option to have on-board memory up to 3 GB. The RAM shall be mapped as shown in FIG. 9.

The first 128 MB memory will be utilized for Operating system, software, scratch data etc., to which user will not have any access. The remaining 2944 MB will be distributed among the various sessions.

The number of sessions and the memory allocated for each session will be taken as input from user and the RDRAM for session based analysis will be divided accordingly.

Operation of GULAB

GULAB interfaces to a host system with the PCI interface only. Raw packets are sent to GULAB from the Host via this interface. GULAB segregates these packets based on sessions and writes it back to the host via the PCI interface.

One scenario is that the protocol analyzed packets uploaded to host by KAMAL are stored in a hard disk in the host. These packets are then uploaded to the GULAB card via PCI interface by the host from hard disk. GULAB will then segregate these packets as per the session they belong to. Once a session is complete, then all these packets that have been re-assembled at session level are uploaded back to host, along with session information such as time stamp, originator and packet count etc. An example is shown below in FIG. 10.

Brief Background

Kamal is a Gigabit level full duplex Packet processing engine. Gulab is a Session level analyzer that uses typically output of Kamal. Kamal comes in 2 variants.

Kamal1: Does protocol level analysis

Kamal2: Does Aggregation based on filter criteria and content match

KAMAL1

Overview

FIG. 1 shows the typical deployment scenario of packet processing engine. Software main components—
1. On-board application software
    a. Network interface
        i. MAC initialize
        ii. UART init
        iii. Dynamic Configuration (if any) for mac
    b. Packet processor
        i. IP Packet verifier (for IPV4)
        ii. Fragment verifier
        iii. Packet re-assembler
        iv. Protocol analyzer
        v. Table builder
    c. Memory interface
        i. RDRAM Memory manager
        ii. SRAM Memory manager
    d. Host interface
        i. Configuration
        ii. Packet down-loader
        iii. Table down-loader
    e. Debug monitor interface (If available)
2. Host software
    a. PCI Device driver
        i. Kamal board detect
        ii. initialize
        iii. set system date & time
        iv. Set ttl
        v. Set table download interval
        vi. Read tag
        vii. Read packet
    b. socket interface
        i. create socket
        ii. bind
        iii. listen
        iv. accept
        v. read
        vi. write.

Correct network format (big endian). Avoid conversion unless absolutely required and necessarily distinguish with a coding standard nomenclature. (e.g. all little endian can have le_xxx names)

Exploit Parallel Processing Capabilities of Micro Engines

PCI: PCI handling should be done at low level. Module should contain multi-channel dma transfers, target and master mode data transfers, interrupt handling and data transfers in optimized way.

Enterprise edition of linux: PCI driver and API library modules should be portable across 32 and 64-bit version of linux OS Linux porting on ixp2400/IXP2800 chip Device drivers for ixf1104 mac MAC programming Device driver for idt tcam TCAM programming Device driver for on-chip pci On-board and host communication ixp2400/IXP2800 micro-engine level handling of incoming packet Micro-engine level handling of pci Micro-engine level handling of memory interface Memory manager (handling of multiple memory simultaneous requests from different modules.) for on-chip memory resource sharing Usage of multi-threading, synchronization of processes, ixp2400/IXP2800 chip programming to exploit power of micro-engines and xscale architecture.

a. Packet processor vii. IP Packet verifier:

This routine runs on the first micro-engine, ME1. When a packet or a fragment is received, it interrupts ixp, which in turn invokes this function. The IP packet header is examined to check if it is ipv4 packet. The status is sent to main arm processor.

viii. Fragment verifier:

Verifies if the fragment bit is set. Accordingly informs the memory manager, Protocol analysis, packet storages and transfers to host has to be done based on internals of the ixp2400/IXP2800 processor.

We know that Kamal is not a software solution; it is rather replacement for a software solution. Hence Kamal needs to be architected like a hardware solution, exploiting parallelism and other special features of the ixp2400/IXP2800 chip.

Kamal development is more like a hardware (may be like a vhd1 or verilog platform) solution, since a lot of processes have to run in true parallel architecture and share common resources.

Packet handling front-end and PCI drivers are classic examples. Traditionally we can develop software for collecting one packet from sof to eof, and then "return" to "calling routine", so that the calling routine can in turn call a routine to analyze the protocol. However, as a hardware solution, we need to examine every incoming quad-octets and take decision, before next quad-octet arrives.

So is the case with PCI. The entire kamal development should be as if it is a hardware platform. Software is useful only to an extent of ease of programming.

Each micro engines simultaneously checks for a pre-assigned application protocol as shown in FIG. 11, extracts parameters relevant to the application, which is using this protocol and reports the result to the control program. Either all modules will return a FALSE value or just one of them will return a TRUE.

Another micro-engine (ME1) would have by now returned the packet validity and fragment status. The parameters to be extracted, specific to an application are documented below, as part of data structure.

| Kamal data upload Format |
|---|
| KAMAL PRTOCOL ANALYSIS TABLE ROW HEADER |
| (KAMAL_fixed_header_format) |
| (28 bytes) |
| PROTOCOL ANALYSIS TABLE ROW |
| (KAMAL_pat_row_format) |
| (152 bytes) |
| KAMAL RAW PACKET HEADER |
| (KAMAL_fixed_header_format) |
| (28 bytes) |
| KAMAL RAW PACKET |
| (Layer II) |

```
/* KAMAL STRUCTURES */
struct KAMAL_FIXED_HEADER_FORMAT
{
    unsigned char KAMAL_ID_STRING[5];
        Board identifier. Always contains the string "KAMAL" for
        kamal. For Gulab it contains "GULAB"
    unsigned char KAMAL_VERSION_STRING[2];
        Kamal Version ID. current version is 00
    unsigned char KAMAL_RELEASE_STRING[2];
        Kamal Release number: Current release is 09 (version 0.9)
    unsigned char KAMAL_PKT_TYPE_IDENTIFIER;
        Record type.
            0 = Record is Protocol analysis table row (pat row)
            1 = Record is raw packet data(layer II)
    unsigned short total_length;
        Total length of this record.
            For pat row record:
                size of record header(28) + size of pat row(152) = 180
            For raw packet data record:
                size of record header(28) + size of layer II raw packet
                data(variable) = variable
    unsigned long KAMAL_BOARD_TAG;
        Unique Kamal board tag that has processed the packet.
    unsigned long packet_counter;
        Sequential packet number
    struct timeval epoch_time_stamp;
        64-bit Time stamp of arrival of the packet in terms of struct
        timeval as defined in <sys/time.h>
            - 32-bts: No of seconds since beginning of epoch
            - 32 bits: No of micro seconds since beginning of epoch
} __attribute__((__packed__));
struct mac_address_format
{
    unsigned char mac_address[6];
} __attribute__((__packed__));
struct KAMAL_ip_details_format
{
    struct mac_address_format KAMAL_eth_src_mac_address;
    struct mac_address_format KAMAL_eth_dst_mac_address;
    unsigned char KAMAL_type_of_service;
    unsigned char KAMAL_ip_protocol;
    unsigned short KAMAL_ip_packet_length;
    unsigned long KAMAL_ip_source_ip_address;
    unsigned long KAMAL_ip_destination_ip_address;
} __attribute__((__packed__));
struct KAMAL_tcp_details_format
{
    unsigned short KAMAL_tcp_source_port;
    unsigned short KAMAL_tcp_destination_port;
    unsigned char KAMAL_tcp_control_flags;
    unsigned char KAMAL_application_description_type;
        This field contains a code that represents type of extracted
        information (which will be sent in
        KAMAL_application_description_string). Its meaning is
        dependent on application protocol.
```

EXAMPLE

| Application type | this field | KAMAL_application_description_string |
|---|---|---|
| HTTP | 1 | website address |
| POP3 Mail | 1 | Mail user ID |
| SMTP Mail | 1 | Mail ID TO whom the mail is sent |
| | 2 | Mail ID FROM whom the mail has been received |
| FTP | 1 | Login ID |

```
    unsigned short KAMAL_tcp_application_protocol;
        A 2 byte code that indicates application level protocol.
        Example: 80 for HTTP, 443 for ssl - https, 110 for POP3
        Mail, 25 for SMTP Mail
} __attribute__((__packed__));
struct KAMAL_application_analysis_format
{
    unsigned char KAMAL_application_protocol_text[40];
        NULL terminated text description of application protocol.
        Exaple: HTTP, ssl-https, POP3 Mail, SMTP Mail.
        [In next version (v1.01), this field will be eliminated.
        Application can decode KAMAL_tcp_application_protocol to
        display this filed in client GUI. Till the codes are
        standardized, in beta version, the code is decoded
        by kamal board itself and the corresponding string is
        sent in this field]
    unsigned char KAMAL_application_description_string[80];
        NULL terminated string containing extracted parameters
        of the packet.
        Example: Web site address, user id, email id to whom mail
        is sent, email id from whom mail is being sent.
} __attribute__((__packed__));
struct KAMAL_pat_row_format
{
    struct KAMAL_ip_details_format KAMAL_ip_details;
    struct KAMAL_tcp_details_format KAMAL_tcp_details;
    struct KAMAL_application_analysis_format application_analysis;
} __attribute__((__packed__));
```

Kamal Board
Set date: Sets time stamp of the kamal/gulab board.
Get date: returns the current date/time on the board
Read filter table: Reads entire filter table in Kamal-II
Upload filter table: creates a new filter table in the kamal-II
Read one filter row: Reads one filter row in kamal-II
Set one filter row: modifies one filter row in kamal-II
Add one filter row: Adds a new filter row in kamal-II
Delete one filter row: Deletes a new filter row in kamal-II
Get kamal tag
Get protocol table
Add protocol table
Delete protocol table
Set default settings As most of kamal calls are for internal use, and as Gulab session analysis interface is required for mss, I have gone in more detailed explanation for gulab card.

Gulab Board
Initialize Gulab card:

Can be used to initialize the board. If the gulab card has been already configured by some other program whose init values are not known and if the current program wants to reset the values, then it can call this function. When a call is made to this function, the gulab card will get initialized to factory setting.

Set application table:

This creates a table in gulab card which will be used to determine which applications are to be analyzed. This table consists of several rows. Each row consists of application type, a text representation of the application and an enable flag.

EXAMPLE

| #APPLICATION_NUMBER | APPLICATION_NAME | ENABLE/DISABLE |
|---|---|---|
| 1 | HTTP | 1 |
| 2 | SMTP | 1 |
| 3 | RTP | 0 |

A value 1 in enable/disable field indicates that the sessions for this type of application need to be assembled. A zero in this field indicates that the sessions for this type of application need not be assembled.

Get application table:
Reads entire application table along with its enable/disable status Delete application row:
For future enhancement. In future, it is expected to define new application protocols, which can be added or deleted.

Add application row:
For future enhancement. In future, it is expected to define new application protocols, which can be added or deleted.

Set application row:
To enable or disable an application row in the application table. Use this function to enable or disable session analysis for one application.

Get application row:
Reads an application row along with its enable/disable status. This function reads the enable/disable flag status and text description of an application.

Set filename base:
Gulab is capable of creating database in various formats. For example, it can create separate file for each application type, each day, weekly or monthly. This call enables the application to provide the base file name using which Gulab creates different files.

Possible format is shown below

```
SetFilenameBase (int APPLICATION_TYPE, int METHOD_TYPE,
unsigned char
*base_string[ ]):
```

Below is a sample implementation

```
SetFilenameBase (SMTP_APPLICATION, MONTH_WISE,
    "mss_smtp_sessions_",
    GULAB_MONTH_STRING, "_2006", NULL);
This will create files such as
mss_smtp_sessions_JUN_2006.glb
mss_smtp_sessions_JUL_2006.glb
A call to following function will create a slightly different type of files
SetFilenameBase (SMTP_APPLICATION, MONTH_WISE,
    "mss_smtp_sessions_",
    GULAB_MONTH_NUMERICAL, "_2006", NULL);
mss_smtp_sessions_06_2006.glb
mss_smtp_sessions_07_2006.glb
```

Another example is

```
SetFilenameBase (ALL_APPLICATIONS, DATE_MONTH_WISE,
"mss_application_sessions_2006", GULAB_MONTH_DATE_
NUMERICAL, NULL);
Will create
mss_application_sessions_20060601.glb
mss_application_sessions_20060602.glb
.
.
.
mss_application_sessions_20060630.glb
etc
```

Get filename base:
  It will return the type of file name base currently in use
Get filename for given application:
  For Future use. Planned for using in incomplete session analysis
Get gulab tag:
  Returns Gulab unique tag. Can be used for creating file name base or analysis tables.
Gulab Data Upload Format

```
GULAB SESSION ANALYSIS TABLE ROW HEADER
        (GULAB_fixed_header_format)
      SESSION ANALYSIS TABLE ROW
        (GULAB_sat_row_format)
   GULAB RAW SESSION DATA HEADER
        (GULAB_fixed_header_format)
        GULAB RAW SESSION DATA
```

```
struct GULAB_FIXED_HEADER_FORMAT
{
    unsigned char GULAB_ID_STRING[5];
        Board identifier. Always contains the string "GULAB" for gulab.
    unsigned char GULAB_VERSION_STRING[2];
        Gulab Version ID.
    unsigned char GULAB_RELEASE_STRING[2];
        Gulab Release number
    unsigned char GULAB_PKT_TYPE_IDENTIFIER;
        Record type.
            0 = Record is Session analysis table row (pat row)
            1 = Record is raw session data
    unsigned short total_length;
        Total length of this record.
            For sat row record:
                size of record header + size of sat row
            For raw packet data record:
                size of record header(28) + size of raw
                session data (variable)
    unsigned long GULAB_BOARD_TAG;
        Unique Gulab board tag that has processed the packet.
    unsigned long session_counter;
        Sequential session number
} __attribute__((__packed__));
struct GULAB_session_details_format
{
    struct timeval start_epoch_time_stamp;
        64-bit Time stamp of start of the session in terms of struct
        timeval as defined in <sys/time.h>
            - 32-bts: No of seconds since beginning of epoch
            - 32 bits: No of micro seconds since beginning of epoch
    struct timeval end_epoch_time_stamp;
        64-bit Time stamp of end of the session in terms of struct
        timeval as defined in <sys/time.h>
            - 32-bts: No of seconds since beginning of epoch
            - 32 bits: No of micro seconds since beginning of epoch
    unsigned long no_of_packets
Contains number of individual packets that were assembled to create
one gulab session
    Unsigned long session_data_size
        Contains total number of bytes that constitute the session
    unsigned char GULAB_application_type;
```

This field contains a code that represents type of application

EXAMPLE

| Application type | this field |
|---|---|
| HTTP | 1 |
| POP3 | 2 |
| SMTP | 3 |
| FTP | 4 |

Padding bytes

```
} __attribute__((__packed__));
struct GULAB_application_information
{
    unsigned char *KAMAL_pointer_to_description_string[TBD][TBD];
        offset of each application description string, list ends with a NULL pointer
    unsigned char KAMAL_application_description_string[TBD][TBD];
        NULL terminated strings containing extracted parameters of the packet.
        Example:for SMTP
            FROM, TO, From, To, Cc, Subject, attachment file names
        for HTTP
            HTTP request, Website, url, Content-Type
} __attribute__((__packed__));
struct GULAB_sat_row_format
{
    struct GULAB_session_details_format     GULAB_session_details;
    struct GULAB_application_information    GULAB_application_information;
} __attribute__((__packed__));
```

Gulab Data and Index File Structure
1. All packets received from Kamal, will be processed by Gulab.
2. Incomplete sessions will be assembled to the extent possible and these incomplete session data will also be stored in a separately tagged file.
3. Yes. Final version will have all the protocols analysis as required.
   a. Are there any parameters MSS is expecting to be extracted from sessions of RTP, SIP, h.323, VoIP, ICMP, Telnet, ftp and DNS.
4. HTTP sessions with 'keep alive' and multi-sessions are processed appropriately by Gulab.
5. Multiple mails will be processed as different sessions
6. Kamal and Gulab cards will be installed and the device drivers operate under linux OS. But the device drivers for gulab and disk drive will be tightly coupled, so that the overheads of session data being copied into multiple areas can be avoided.
7. Gulab will create one file per application type. In addition it also creates one file to collect all "Incomplete Sessions". The high level details are as follows

| Gulab header |
|---|
| (Even if the session did not start/end appropriately) |
| HTTP-Gulab data |
| Kamal header -x (belonging to this session) |
| Kamal raw packet data -x (belonging to this session) |
| Pointer to raw packet data-x in Gulab data file |
| Kamal header -w (belonging to this session) |
| Kamal raw packet data -w (belonging to this session) |
| Pointer to raw packet data-w in Gulab data file |
| . |
| . |
| . |

| KAMAL Header |
|---|
| Packet counter |
| Packet size |
| Packet counter |
| Time stamp |
| Packet counter |
| Source mac address |
| Destination mac address |
| Source ip address |
| Destination ip address |
| Source port |
| Destination port |
| TCP Control flags |
| TCP Type of service |
| Transport protocol |
| TCP protocol |

| HTTP sessions file | | Incomplete sessions file |
|---|---|---|
| HTTP-Gulab header-1 | SMTP sessions file | Incomplete-Gulab header-1 |
| HTTP-Gulab Data-1 | | Incomplete-Gulab Data-1 |
| HTTP-Gulab Data | POP3 sessions file | Incomplete-Gulab Data index - 1 |
| HTTP-Gulab header-2 | | Incomplete-Gulab header-2 |
| HTTP-Gulab Data-2 | | Incomplete-Gulab Data-2 |
| HTTP-Gulab Data index-2 | . | Incomplete-Gulab Data index -2 |
| . | . | . |
| . | . | . |
| . | . | . |
| HTTP-Gulab header-n | DNS sessions file | Incomplete-Gulab header-n |
| HTTP-Gulab Data-n | | Incomplete-Gulab Data-n |
| HTTP-Gulab Data index -n | | Incomplete-Gulab Data index -n |

The Gulab session is saved in 2 segments.
1. Index file
2. Data file.

$1^{st}$ type, called "gulab index file", consists of fixed length records, does not contain the raw packet data but only consists of a pointer to corresponding raw packet data record in the "Gulab data file" (type 2).

$2^{nd}$ type called "gulab data file", consists of variable length records and contains actual raw packet data (which is of variable length).

Type 1 can be used for searching, sorting, aggregating, displaying of graphs & charts and for supporting queries/query scripts/languages.

The type 2 files consist of actual raw packets that can be accessed directly through type-1 file for actual access of data.

The fields specific to type-1 field are shown in italic and fields specific to type-2 are shown double-underlined.

Embodiments in which KAMAL and GULAB are implemented by means of Intel's network processor such as IXP2400/IXP2800 are described in detail above. It will be understood by those with ordinary skills in the art, however, that the present invention may be implemented by means of field programmable gate array and/or application specific integrated circuit technologies.

The invention claimed is:
1. A hardware-based method for monitoring Network data traffic, said method comprising steps of:
   a. sniffing packets
   b. checking the packets sniffed in step a. for a pre-assigned application protocol for simultaneously extracting a parameter relevant to applications by microengines,
   c. analyzing the parameter extracted in step b. for a plurality of information and then saving the sniffed packets associated with the analyzed parameter onto host memory
   d. segregating the packets saved in step c. for each protocol type as per the session they belong to,
   e. analyzing the packets segregated in step d, and
   f. re-assembling the packets with session information for uploading onto the host memory, wherein the session is saved in two segments called index file and data file, and wherein the method traces the origin of the traffic in the network which is identified using MAC (Media Access Control) address of the source and destination of the session, start and end time of the session and unique tag assigned for processing engine and application layer processor card.

* * * * *